(12) United States Patent
Kim et al.

(10) Patent No.: US 12,006,429 B2
(45) Date of Patent: Jun. 11, 2024

(54) THERMOPLASTIC RESIN COMPOSITION

(71) Applicant: LG CHEM, LTD., Seoul (KR)

(72) Inventors: Seo Hwa Kim, Daejeon (KR); Byoung Il Kang, Daejeon (KR); Eun Jung Choi, Daejeon (KR); Taek Jun Jung, Daejeon (KR); Jeong In Cho, Daejeon (KR); Dong Kun Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 753 days.

(21) Appl. No.: 17/051,740

(22) PCT Filed: Sep. 11, 2019

(86) PCT No.: PCT/KR2019/011840
§ 371 (c)(1),
(2) Date: Oct. 29, 2020

(87) PCT Pub. No.: WO2020/060110
PCT Pub. Date: Mar. 26, 2020

(65) Prior Publication Data
US 2021/0238407 A1  Aug. 5, 2021

(30) Foreign Application Priority Data

Sep. 21, 2018 (KR) .................. 10-2018-0113966
Sep. 6, 2019 (KR) .................. 10-2019-0110895

(51) Int. Cl.
*C08L 55/02* (2006.01)
*C08L 25/12* (2006.01)
*C08L 33/20* (2006.01)

(52) U.S. Cl.
CPC ............... *C08L 55/02* (2013.01); *C08L 25/12* (2013.01); *C08L 33/20* (2013.01)

(58) Field of Classification Search
CPC ........... C08L 55/02; C08L 25/12; C08L 33/20
USPC ...................................................... 524/504
See application file for complete search history.

(56) References Cited

U.S. PATENT DOCUMENTS

| 5,994,463 | A  | 11/1999 | Eckel et al. |
| 6,140,426 | A  | 10/2000 | Sarabi |
| 2007/0123648 | A1 | 5/2007 | Lee et al. |
| 2007/0142524 | A1 | 6/2007 | Ryu et al. |
| 2008/0167426 | A1 | 7/2008 | Kim et al. |
| 2011/0097561 | A1 | 4/2011 | Kang et al. |
| 2012/0322945 | A1 | 12/2012 | Tomita et al. |
| 2016/0075813 | A1 | 3/2016 | Niessner et al. |
| 2018/0030191 | A1 | 2/2018 | Chai |
| 2018/0072834 | A1 | 3/2018 | Suk |
| 2019/0062484 | A1 | 2/2019 | Jang et al. |

FOREIGN PATENT DOCUMENTS

| CN | 1195000 A | 10/1998 |
| CN | 1331727 A | 1/2002 |
| CN | 1795210 A | 6/2006 |
| CN | 102782039 A | 11/2012 |
| CN | 107250264 A | 10/2017 |
| CN | 107406594 A | 11/2017 |
| JP | H01-092261 A | 4/1989 |
| JP | H03177405 A | 8/1991 |
| JP | H04198255 A | 7/1992 |
| JP | H09-263680 A | 10/1997 |
| JP | 2002-206043 A | 7/2002 |
| JP | 2006528722 A | 12/2006 |
| JP | 2008-519153 A | 6/2008 |
| JP | 2008521997 A | 6/2008 |
| JP | 2010070646 A | 4/2010 |
| JP | 2011521068 A | 7/2011 |
| JP | 5805066 B1 | 11/2015 |
| KR | 10-2003-0056421 A | 7/2003 |
| KR | 10-2009-0073453 A | 7/2009 |
| KR | 2009073453 A * | 7/2009 |
| KR | 10-2014-0047735 A | 4/2014 |
| KR | 10-2015-0004008 A | 1/2015 |
| KR | 10-2015-0144795 A | 12/2015 |
| KR | 10-2016-0063021 A | 6/2016 |
| KR | 10-2016-0074729 A | 6/2016 |
| KR | 10-2018-0086837 A | 8/2018 |
| WO | WO0024829 A1 | 5/2000 |
| WO | WO2011-108486 A1 | 9/2011 |
| WO | 2014/192766 A1 | 12/2014 |

OTHER PUBLICATIONS

Schellenberg J et al: "Influence of styrene-acrylonitrile oligomers on the properties of ABS graft copolymers", European Polymer Journal, 1993, vol. 29, No. 5, pp. 727-730, XP024053265.
Extended European Search Report for Application No. 19861851.4, mailed Sep. 29, 2021.
Takuya Ishikawa, "Certificate of Experimental Results (1)," Jan. 12, 2023.
Takuya Ishikawa, "Certificate of Experimental Results (2)," Jan. 12, 2023.

(Continued)

*Primary Examiner* — Ling Siu Choi
*Assistant Examiner* — Ronald Grinsted

(57) ABSTRACT

The present invention provides a thermoplastic resin composition which includes: a first copolymer including a core including a conjugated diene-based polymer and a shell including an aromatic vinyl-based monomer unit and a vinyl cyan-based monomer unit; and a second copolymer including an aromatic vinyl-based monomer unit and a vinyl cyan-based monomer unit, wherein the first copolymer has a degree of grafting of 32 to 50%, the second copolymer has a weight-average molecular weight of 85,000 to 115,000 g/mol, and the thermoplastic resin composition includes the first copolymer at 30 wt % or less and an oligomer residue at 1.1 wt % or less. Specifically, the thermoplastic resin composition can shorten an injection molding time.

11 Claims, No Drawings

(56) References Cited

OTHER PUBLICATIONS

J. Brandrup et al., "Polymer Handbook, Fourth Edition," Wiley-Interscience, 2003, pp. VII/5, VII/27-VII/29.
J.D. Moore, "Acrylonitrile-butadiene-styrene (ABS)—a review," Composites, May 1973, pp. 118-130, 4(3).

* cited by examiner

THERMOPLASTIC RESIN COMPOSITION

CROSS-REFERENCE TO RELATED APPLICATION

This application is a National Phase of International Application No.: PCT/KR2019/011840, filed Sep. 11, 2019, which claims priority to and the benefit of Korean Patent Application No. 10-2018-0113966, filed on Sep. 21, 2018, and Korean Patent Application No. 10-2019-0110895, filed on Sep. 6, 2019, the disclosures of which are incorporated herein by reference in their entirety.

TECHNICAL FIELD

The present invention relates to a thermoplastic resin composition, and particularly, to a thermoplastic resin composition which shortens an injection molding time without degradation of appearance characteristics.

BACKGROUND ART

Since a thermoplastic resin composition including an ABS graft copolymer has all of chemical resistance, stiffness, impact resistance, and processability and exhibits excellent surface glossiness and excellent processability in secondary processing such as plating, printing, coating, and the like, it has been used for a wide range of applications including home appliances, automobiles, miscellaneous goods, and the like.

When the thermoplastic resin composition is used to manufacture parts of home appliances or automobiles, an injection molding process is frequently used. Therefore, in order to enhance productivity in injection molding, various efforts have been made to shorten an injection molding time. Specifically, methods of adjusting the design, such as thickness and the like, of a product, optimally designing a mold, and the like have been proposed, but they have a limitation. In addition, when the processing conditions are adjusted (e.g., an injection temperature is lowered), appearance quality is degraded. Nowadays, an injection molding time, especially, a cooling time, is further increased due to larger parts and the like.

Accordingly, it is required to develop a material capable of shortening an injection molding time in order to enhance productivity of an injection-molded article made of the thermoplastic resin composition.

DISCLOSURE

Technical Problem

The present invention is directed to providing a thermoplastic resin composition which can shorten an injection molding time without degradation of appearance characteristics so as to enhance productivity, and exhibits excellent appearance characteristics.

Technical Solution

One aspect of the present invention provides a thermoplastic resin composition which includes: a first copolymer including a conjugated diene-based polymer, an aromatic vinyl-based monomer, and a vinyl cyan-based monomer unit; and a second copolymer including an aromatic vinyl-based monomer unit and a vinyl cyan-based monomer unit, wherein the first copolymer has a degree of grafting of 32 to 50%, the second copolymer has a weight-average molecular weight of 85,000 to 115,000 g/mol, and the thermoplastic resin composition includes the first copolymer at 30 wt % or less and an oligomer residue at 1.1 wt % or less.

Advantageous Effects

A thermoplastic resin composition according to the present invention can shorten a cooling time without degradation of appearance characteristics during injection molding due to its high solidification rate. Therefore, a molded article made of the thermoplastic resin composition according to the present invention can have further enhanced productivity.

Modes of the Invention

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the oligomer residue may be determined by gas chromatography (GC). Specifically, the oligomer residue may be determined by analysis via automatic liquid sampler-gas chromatography/flame ionization detector (ALS-GC/FID) after 2 g of a pellet-type thermoplastic resin composition is dissolved in 10 ml of chloroform and then precipitated with 30 ml of methanol to collect a supernatant, and the supernatant was filtered (through a 0.2-μm disc syringe filter).

In the present invention, the melt flow index may be measured in accordance with ASTM D1238 at 220° C. and 10 kg.

In the present invention, the degree of grafting for a first copolymer may be measured by the following equation after 2 g of first copolymer powder is dissolved in 300 ml of acetone while stirring for 24 hours and then centrifuged in a centrifuge, the acetone solution thus separated is added dropwise to methanol to obtain a ungrafted portion, then the ungrafted portion is dried at 60 to 120° C. to obtain dry solid, and the dry solid is weighed.

Degree of grafting (%)=[2g−(Weight of dry solid)−(Weight of conjugated diene-based polymer)]/(Weight of conjugated diene-based polymer)×100

Weight of conjugated diene-based polymer=Weight of solid of conjugated diene-based polymer theoretically added to 2 g of graft copolymer powder; or Weight of conjugated diene-based polymer as measured by analyzing a graft copolymer through infrared spectroscopy In the present invention, the weight-average molecular weight of a shell of a first copolymer may refer to a weight-average molecular weight of a copolymer including an aromatic vinyl-based monomer unit and a vinyl cyan-based monomer unit which are grafted onto a conjugated diene-based polymer.

In the present invention, the weight-average molecular weight of a shell of a first copolymer may be measured as a relative value with respect to a standard polystyrene (PS) sample by gel permeation chromatography (GPC) after the dry solid mentioned in the measurement method of a degree of grafting is dissolved in a tetrahydrofuran (THF) solution at a concentration of 1 wt % and then filtered through a 1-μm filter.

In the present invention, the average particle diameter of a conjugated diene-based polymer may be measured by a dynamic light scattering method, specifically, by using a Nicomp 380 instrument (manufactured by PSS Nicomp).

In the specification, the average particle diameter may refer to an arithmetic average particle diameter in the particle size distribution as measured by a dynamic light scattering method, that is, an average particle diameter in a scattering intensity distribution.

In the present invention, the weight-average molecular weight of a second copolymer may be measured as a relative value with respect to a standard PS sample by GPC using THF as an eluate.

1. Thermoplastic Resin Composition

A thermoplastic resin composition according to an embodiment of the present invention includes: 1) a first copolymer including a conjugated diene-based polymer, an aromatic vinyl-based monomer, and a vinyl cyan-based monomer unit; and 2) a second copolymer including an aromatic vinyl-based monomer unit and a vinyl cyan-based monomer unit, wherein 1) the first copolymer has a degree of grafting of 32 to 50%, 2) the second copolymer has a weight-average molecular weight of 85,000 to 115,000 g/mol, and the thermoplastic resin composition includes the first copolymer at 30 wt % or less and an oligomer residue at 1.1 wt % or less.

The thermoplastic resin composition preferably includes an oligomer residue at 1 wt % or less. The oligomer residue is a by-product produced in the preparation of each of the first copolymer and the second copolymer and is included in the first copolymer and the second copolymer. In addition, since only a small amount of the oligomer residue is volatilized during the processing of the thermoplastic resin composition unlike a monomer residue, in consideration of the content of the oligomer residue in the first and second copolymers, the thermoplastic resin composition needs to be prepared such that the oligomer residue is included at the above-described content or less. When the oligomer residue is included at the above-described content, a solidification rate of the thermoplastic resin composition can be increased in injection molding, and thus a cooling time can be significantly reduced during injection molding. In addition, even if a cooling time is significantly reduced, appearance defects such as ejector pin marks do not occur, and thus appearance characteristics are excellent. Above the above-described content, the oligomer residue serves as a plasticizer in the thermoplastic resin composition so as to decrease a solidification rate of the thermoplastic resin composition in injection molding, and a cooling time ultimately becomes longer during injection molding.

The thermoplastic resin composition according to an embodiment of the present invention includes the first copolymer at 30 wt % or less. Above the above-described content, injection moldability is degraded due to a lower melt flow index of the thermoplastic resin composition, and accordingly, an injection temperature has to be increased, which leads to an increase in cooling time during injection molding.

The thermoplastic resin composition according to an embodiment of the present invention may include the first copolymer at 10 to 30 wt % and the second copolymer at 70 to 90 wt %, and preferably includes the first copolymer at 18 to 28 wt % and the second copolymer at 72 to 82 wt %.

When the above-described content is satisfied, the melt flow index of the thermoplastic resin composition can be appropriately maintained, and thus injection moldability can be enhanced. Accordingly, the injection molding of the thermoplastic resin composition at an appropriate temperature is possible, and thus a cooling time can be reduced during the injection molding. In addition, a thermoplastic resin composition having excellent mechanical properties can be provided.

The thermoplastic resin composition may have a melt flow index of 30 g/10 min or more or 30 to 50 g/10 min, as measured at 220° C. and 10 kg, with the range of 30 to 50 g/10 min being preferred. The melt flow index is a factor influenced by the degree of grafting for the first copolymer and the weight-average molecular weight of the second copolymer. When the above-described condition is satisfied so that injection moldability is enhanced, the injection at an appropriate temperature is possible, and thus a cooling time can be reduced during injection molding.

Hereinafter, the first and second copolymers included in the thermoplastic resin composition according to an embodiment of the present invention will be described in detail.

1) First Copolymer

The first copolymer includes a conjugated diene-based polymer, an aromatic vinyl-based monomer unit, and a vinyl cyan-based monomer unit.

The first copolymer may impart excellent impact resistance, excellent chemical resistance, and excellent processability to the thermoplastic resin composition.

The first copolymer may have a degree of grafting of 32 to 50%, preferably, to 45%. When the above-described range is satisfied, the melt flow index of the thermoplastic resin composition can be appropriately maintained, and thus injection moldability can be enhanced. Accordingly, the injection molding of the thermoplastic resin composition at an appropriate temperature is possible, and thus a cooling time can be reduced during the injection molding. Above the above-described range, injection moldability is degraded due to a lower melt flow index of the thermoplastic resin composition, and accordingly, an injection temperature has to be increased, which leads to an increase in cooling time during injection molding. Below the above-described range, the impact resistance of the thermoplastic resin composition is degraded.

The shell of the first copolymer may have a weight-average molecular weight of 55,000 to 95,000 g/mol or 60,000 to 90,000 g/mol, with the range of 60,000 to 90,000 g/mol being preferred. When the above-described range is satisfied, the melt flow index of the thermoplastic resin composition can be appropriately maintained, and thus injection moldability can be enhanced. Accordingly, the injection molding of the thermoplastic resin composition at an appropriate temperature is possible, and thus a cooling time can be reduced during the injection molding. In addition, the thermoplastic resin composition can realize excellent impact resistance.

The conjugated diene-based polymer may impart excellent impact resistance and excellent surface gloss characteristics to the first copolymer.

The conjugated diene-based polymer may include a modified conjugated diene-based polymer prepared by graft polymerization of a conjugated diene-based polymer with an aromatic vinyl-based monomer and a vinyl cyan-based monomer.

The conjugated diene-based polymer may be prepared by polymerization, preferably, emulsion polymerization of conjugated diene-based polymer, and the conjugated diene-based monomer may be one or more selected from the group consisting of 1,3-butadiene, isoprene, chloroprene, and piperylene, with 1,3-butadiene being preferred.

The conjugated diene-based polymer may have an average particle diameter of 0.05 to 0.5 µm or 0.1 to 0.4 µm, with the range of 0.1 to 0.4 µm being preferred. When the above-described condition is satisfied, the impact resistance and surface gloss characteristics of the first copolymer can be improved.

The conjugated diene-based polymer may be included at 50 to 70 wt % or 55 to 65 wt % with respect to the total weight of the first copolymer, with the range of 55 to 65 wt % being preferred. When the above-described condition is satisfied, the stiffness, mechanical properties, processability, and surface gloss characteristics of the first copolymer can be improved.

The aromatic vinyl-based monomer unit may impart excellent processability, excellent stiffness, and excellent mechanical properties to the first copolymer.

The aromatic vinyl-based monomer unit may be a unit derived from one or more selected from the group consisting of styrene, α-methylstyrene, α-ethylstyrene, and p-methylstyrene, with the unit derived from styrene being preferred.

The aromatic vinyl-based monomer may be included at 20 to 40 wt % or 25 to 35 wt % with respect to the total weight of the first copolymer, with the range of 25 to 35 wt % being preferred. When the above-described range is satisfied, the processability, stiffness, and mechanical properties of the first copolymer can be improved.

The vinyl cyan-based monomer unit may impart excellent chemical resistance to the first copolymer.

The vinyl cyan-based monomer unit may be a unit derived from one or more selected from the group consisting of acrylonitrile, methacrylonitrile, phenylacrylonitrile, and α-chloroacrylonitrile, with the unit derived from acrylonitrile being preferred.

The vinyl cyan-based monomer unit may be included at 1 to 20 wt % or 5 to 15 wt % with respect to the total weight of the first copolymer, with the range of 5 to 15 wt % being preferred. When the above-described range is satisfied, the chemical resistance of the first copolymer can be improved.

The first copolymer may include an oligomer residue at 1.5 wt % or less or 1.3 wt % or less, with the range of 1.3 wt % or less being preferred. When the above-described range is satisfied, the thermoplastic resin composition may include as little as possible oligomer residue, specifically, 1.1 wt % or less of an oligomer residue.

The first copolymer may be prepared by emulsion polymerization or bulk polymerization of the conjugated diene-based polymer with the aromatic vinyl-based monomer and the vinyl cyan-based monomer, with emulsion polymerization being preferred for the first copolymer to realize excellent impact resistance and excellent surface gloss characteristics.

2) Second Copolymer

The second copolymer includes an aromatic vinyl-based monomer unit and a vinyl cyan-based monomer unit.

The second copolymer may impart excellent chemical resistance, excellent impact resistance, and excellent processability to the thermoplastic resin composition.

The second copolymer may have a weight-average molecular weight of 85,000 g/mol to 115,000 g/mol, preferably 90,000 g/mol to 115,000 g/mol, and more preferably 90,000 g/mol to 110,000 g/mol. When the above-described content is satisfied, the melt flow index of the thermoplastic resin composition can be appropriately maintained, and thus injection moldability can be enhanced. Accordingly, the injection molding of the thermoplastic resin composition at an appropriate temperature is possible, and thus a cooling time can be reduced during the injection molding. In addition, the second copolymer can impart excellent impact resistance to the thermoplastic resin composition. Below the above-described range, injection moldability is degraded due to a lower melt flow index of the thermoplastic resin composition, and accordingly, an injection temperature has to be increased, which leads to an increase in cooling time during injection molding. Above the above-described range, the impact resistance of the thermoplastic resin composition is degraded.

The second copolymer may include the aromatic vinyl-based monomer unit and the vinyl cyan-based monomer unit in a weight ratio of 65:35 to 80:20 or 70:30 to 80:20, with the range of 70:30 to 80:20 being preferred. When the above-described range is satisfied, the second copolymer can impart superior chemical resistance, superior impact resistance, and superior processability to the thermoplastic resin composition.

The second copolymer may include an oligomer residue at 1.6 wt % or less or 1.5 wt % or less, with the range of 1.5 wt % or less being preferred. When the above-described range is satisfied, the thermoplastic resin composition may include as little as possible oligomer residue, specifically, 1.1 wt % or less of an oligomer residue.

The second copolymer may be prepared by suspension polymerization or bulk polymerization of an aromatic vinyl-based monomer and a vinyl cyan-based monomer, with bulk polymerization capable of preparing a high-purity copolymer being preferred.

The second copolymer may be prepared, specifically, by a method including the steps of: (1) preparing a polymerization product by adding an aromatic vinyl-based monomer and a vinyl cyan-based monomer to a reactor and bulk-polymerizing the same; and (2) devolatilizing the polymerization product.

The bulk polymerization may be performed at 130 to 150° C. When the above-described temperature range is satisfied, the formation of an oligomer, which is a reaction by-product, can be suppressed as much as possible.

In addition, an initiator whose 1-hour half-life temperature is 105 to 145° C. is preferably used in bulk polymerization such that the bulk polymerization is easily performed at the above-described temperature.

The initiator may be an organic peroxide and may be one or more selected from the group consisting of dicumyl peroxide, 2,2-bis(4,4-di-t-butylperoxy cy clohexane)propane, 1,1-bis(t-butylperoxy)cyclohexane, and 1,1-bis(t-hexylperoxy)cyclohexane, with dicumyl peroxide being preferred.

In the step (1), a reaction solvent and a molecular weight controlling agent may be further added to the reactor.

The reaction solvent may be one or more selected from the group consisting of ethylbenzene, toluene, xylene, methyl ethyl ketone, and methyl isobutyl ketone, with toluene being preferred.

The molecular weight controlling agent may be one or more selected from the group consisting of n-dodecyl mercaptan, n-amyl mercaptan, t-butyl mercaptan, t-dodecyl mercaptan, n-hexyl mercaptan, n-octyl mercaptan, and n-nonyl mercaptan, with t-dodecyl mercaptan being preferred.

In the step (2), the polymerization product may be primarily devolatilized at 150 to 160° C. and 400 Torr or less, and then the polymerization product having been primarily devolatilized may be secondarily devolatilized at 230 to 250° C. and 20 Torr or less. When the polymerization product is devolatilized under the above-described conditions, the residual reaction solvent and an oligomer residue included in the polymerization product can be eliminated as much as possible.

The second copolymer is prepared by the above-described method, so that a significantly small amount of oligomer residue may be included compared to a conventional copolymer.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

EXAMPLES AND COMPARATIVE EXAMPLES

A graft copolymer and a matrix copolymer were uniformly mixed in contents shown in the following Tables 1 and 2 to prepare thermoplastic resin compositions.

Experimental Example 1

Each of the thermoplastic resin compositions of Examples and Comparative Examples was put into a twin-screw extruder set at a barrel temperature of 230° C. to prepare a pellet-type thermoplastic resin composition. Afterward, physical properties of the pellet-type thermoplastic resin composition were measured by methods described below, and results thereof are shown in the following Tables 1 and 2.

(1) Oligomer residue (wt %): determined by analysis via automatic liquid sampler-gas chromatography/flame ionization detector (ALS-GC/FID) after 2 g of the pellet-type thermoplastic resin composition was dissolved in 10 ml of chloroform and then precipitated with 30 ml of methanol to collect a supernatant, and the supernatant was filtered (through a 0.2-μm disc syringe filter).

(2) Melt flow index (g/10 min): measured in accordance with ASTM D1238, at 220° C. and 10 kg.

Experimental Example 2

The pellet-type thermoplastic resin composition prepared in Experimental Example 1 was injection-molded to prepare a specimen, and physical properties of the specimen were measured by methods described below, and results thereof are shown in the following Tables 1 and 2.

(3) Necessary cooling time (sec): determined by injection-molding the pellet-type thermoplastic resin composition using a customized mold at an injection machine temperature of 220° C. and a mold temperature of 60° C. and then measuring the time taken until appearance defects such as ejector pin marks did not occur in the molded article taken out of the mold.

(4) Heat deflection temperature (HDT, ° C.): measured in accordance with ASTM D648 under a condition of 18.6 kg.

TABLE 1

| Classification | | Examples | | | | | | |
|---|---|---|---|---|---|---|---|---|
| | | 1 | 2 | 3 | 4 | 5 | 6 | 7 |
| Graft copolymer (parts by weight) | 1-1 | 10 | 18 | 24 | 28 | — | 24 | 24 |
| | 1-2 | — | — | — | — | 24 | — | — |
| Matrix copolymer (parts by weight) | 2-1 | 90 | 82 | 76 | 72 | 76 | 60 | 40 |
| | 2-2 | — | — | — | — | — | 16 | 36 |
| Oligomer residue (wt %) | | 0.4 | 0.4 | 0.5 | 0.5 | 0.5 | 0.7 | 0.9 |
| Melt flow index (g/10 min) | | 50 | 45 | 38 | 34 | 37 | 40 | 42 |
| Necessary cooling time (sec) | | 20 | 20 | 21 | 22 | 20 | 23 | 25 |
| HDT (° C.) | | 95 | 94 | 94 | 93 | 94 | 91 | 90 |

1-1: ABS graft copolymer (DP270M manufactured by LG Chem Ltd., average particle diameter of core: 0.3 μm, degree of grafting: 37%, weight-average molecular weight of shell: 80,000 g/mol, oligomer residue: 1.0 wt %)
1-2: ABS graft copolymer (DP280 manufactured by LG Chem Ltd., average particle diameter of core: 0.3 μm, degree of grafting: 45%, weight-average molecular weight of shell: 70,000 g/mol, oligomer residue: 1.2 wt %)
2-1: SAN copolymer (95RF manufactured by LG Chem Ltd., content of acrylonitrile unit: 31 wt %, weight-average molecular weight: 90,000 g/mol, oligomer residue: 0.3 wt %)
2-2: SAN copolymer (81HF manufactured by LG Chem Ltd., content of acrylonitrile unit: 24 wt %, weight-average molecular weight: 110,000 g/mol, oligomer residue: 1.5 wt %)

TABLE 2

| Classification | | Comparative Examples | | | | | | | | |
|---|---|---|---|---|---|---|---|---|---|---|
| | | 1 | 2 | 3 | 4 | 5 | 6 | 7 | 8 | 9 |
| Graft copolymer (parts by weight) | 1-1 | 24 | 35 | 24 | — | — | — | 24 | 24 | 24 |
| | 1-3 | — | — | — | 24 | — | — | — | — | — |
| | 1-4 | — | — | — | — | 24 | — | — | — | — |
| | 1-5 | — | — | — | — | — | 24 | — | — | — |

TABLE 2-continued

| Classification | | Comparative Examples | | | | | | | | |
|---|---|---|---|---|---|---|---|---|---|---|
| | | 1 | 2 | 3 | 4 | 5 | 6 | 7 | 8 | 9 |
| Matrix copolymer (parts by weight) | 2-1 | — | 65 | — | 76 | 76 | — | — | — | — |
| | 2-2 | 76 | — | — | — | — | 76 | — | — | — |
| | 2-3 | — | — | 76 | — | — | — | — | — | — |
| | 2-4 | — | — | — | — | — | — | 76 | — | — |
| | 2-5 | — | — | — | — | — | — | — | 76 | — |
| | 2-6 | — | — | — | — | — | — | — | — | 76 |
| Oligomer residue (wt %) | | 1.4 | 0.5 | 0.5 | 0.5 | 0.5 | 0.5 | 2.3 | 2.7 | 2.5 |
| Melt flow index (g/10 min) | | 40 | 24 | 24 | 29 | 26 | 28 | 38 | 9 | 44 |
| Necessary cooling time (sec) | | 39 | 38 | 35 | 31 | 33 | 37 | 40 | 42 | 40 |
| HDT (° C.) | | 88 | 89 | 93 | 90 | 90 | 89 | 87 | 88 | 88 |

1-1: ABS graft copolymer (DP270M manufactured by LG Chem Ltd., average particle diameter of core: 0.3 μm, degree of grafting: 37%, weight-average molecular weight of shell: 80,000 g/mol, oligomer residue: 1.0 wt %)
1-3: ABS graft copolymer (manufactured by LG Chem Ltd., average particle diameter of core: 0.3 μm, degree of grafting: 77%, weight-average molecular weight of shell: 40,000 g/mol, oligomer residue: 1.1 wt %)
1-4: ABS graft copolymer (manufactured by LG Chem Ltd., average particle diameter of core: 0.3 μm, degree of grafting: 55%, weight-average molecular weight of shell: 110,000 g/mol, oligomer residue: 1.3 wt %)
1-5: ABS graft copolymer (manufactured by LG Chem Ltd., average particle diameter of core: 0.3 μm, degree of grafting: 27%, weight-average molecular weight of shell: 100,000 g/mol, oligomer residue: 1.1 wt %)
2-1: SAN copolymer (95RF manufactured by LG Chem Ltd., content of acrylonitrile unit: 31 wt %, weight-average molecular weight: 90,000 g/mol, oligomer residue: 0.3 wt %)
2-2: SAN copolymer (81HF manufactured by LG Chem Ltd., content of acrylonitrile unit: 24 wt %, weight-average molecular weight: 110,000 g/mol, oligomer residue: 1.5 wt %)
2-3: SAN copolymer (92RF manufactured by LG Chem Ltd., content of acrylonitrile unit: 27 wt %, weight-average molecular weight: 120,000 g/mol, oligomer residue: 0.4 wt %)
2-4: SAN copolymer (82TR manufactured by LG Chem Ltd., content of acrylonitrile unit: 18 wt %, weight-average molecular weight: 130,000 g/mol, oligomer residue: 2.7 wt %)
2-5: SAN copolymer (97HC manufactured by LG Chem Ltd., content of acrylonitrile unit: 31 wt %, weight-average molecular weight: 170,000 g/mol, oligomer residue: 3.2 wt %)
2-6: SAN copolymer (manufactured by LG Chem Ltd., content of acrylonitrile unit: 32 wt %, weight-average molecular weight: 80,000 g/mol, oligomer residue: 3.0 wt %)

Referring to Tables 1 and 2, in the case of Example 1 to Example 7 including a first copolymer and a second copolymer, it can be seen that since the content of an oligomer residue and the melt flow index were maintained at appropriate levels, a necessary cooling time was short. Therefore, it can be predicted that when the thermoplastic resin composition has appropriate levels of the oligomer residue content and the melt flow index and includes the same type of first copolymer, as the content of the first copolymer is lower, a necessary cooling time is shortened, and a heat deflection temperature is increased, resulting in excellent injection moldability and excellent heat resistance.

In addition, it can be predicted that as the content of an oligomer residue in the thermoplastic resin composition is lower, a necessary cooling time is shortened, and a heat deflection temperature is increased, resulting in excellent injection moldability and excellent heat resistance.

Meanwhile, although the thermoplastic resin composition of Comparative Example 1 included both first and second copolymers, the content of an oligomer residue was high, and accordingly, a necessary cooling time became longer. From this result, it can be predicted that injection moldability is significantly degraded.

The thermoplastic resin composition of Comparative Example 2 included an excessive amount of a first copolymer, such that it exhibited a significantly lowered melt flow index despite including an appropriate amount of an oligomer residue, and accordingly, a necessary cooling time became longer. From this result, it can be predicted that injection moldability is significantly degraded.

The thermoplastic resin composition of Comparative Example 3 did not include a second copolymer and included only first and third copolymers, such that it exhibited a significantly lowered melt flow index despite including an appropriate amount of an oligomer residue, and accordingly, a necessary cooling time became longer. From this result, it can be predicted that injection moldability is significantly degraded.

The thermoplastic resin compositions of Comparative Examples 4 and 5 did not include a first copolymer, such that they exhibited a significantly lowered melt flow index despite including an appropriate amount of an oligomer residue, and accordingly, a necessary cooling time became longer. From this result, it can be predicted that injection moldability is significantly degraded.

The thermoplastic resin composition of Comparative Example 6 included a graft copolymer having a degree of grafting of 24%, such that it exhibited a melt flow index of 30 g/10 min despite including an appropriate amount of an oligomer residue, and accordingly, a necessary cooling time became longer. From this result, it can be predicted that injection moldability is degraded.

The thermoplastic resin composition of Comparative Example 7 included not a second copolymer but a sixth copolymer having a high weight-average molecular weight and a high acrylonitrile unit content, such that the content of an oligomer residue was increased, and accordingly, a necessary cooling time became longer. From this result, it can be predicted that injection moldability is degraded.

The thermoplastic resin composition of Comparative Example 8 included not a second copolymer but a seventh copolymer having a high weight-average molecular weight, such that the content of an oligomer residue was increased, and accordingly, a necessary cooling time became longer. From this result, it can be predicted that injection moldability is degraded.

The thermoplastic resin composition of Comparative Example 9 included not a second copolymer but an eighth copolymer having a low weight-average molecular weight and a high oligomer residue content, such that the content of an oligomer residue was increased, and accordingly, a necessary cooling time became longer. From this result, it can be predicted that injection moldability is degraded.

The invention claimed is:

1. A thermoplastic resin composition comprising:
   a first copolymer including a conjugated diene-based polymer, an aromatic vinyl-based monomer unit, and a vinyl cyan-based monomer unit; and
   a second copolymer including an aromatic vinyl-based monomer unit and a vinyl cyan-based monomer unit,
   wherein the first copolymer has a degree of grafting of 32 to 50%,
   the second copolymer has a weight-average molecular weight of 85,000 to 115,000 g/mol, and
   the thermoplastic resin composition includes 30 wt % or less of the first copolymer and 1.1 wt % or less of an oligomer residue.

2. The thermoplastic resin composition of claim 1, wherein the second copolymer is 90,000 g/mol to 115,000 g/mol.

3. The thermoplastic resin composition of claim 1, which includes 1 wt % or less of an oligomer residue.

4. The thermoplastic resin composition of claim 1, which has a melt flow index of 30 g/10 min or more, as measured at 220° C. and 10 kg.

5. The thermoplastic resin composition of claim 1, which has a melt flow index of 30 to 50 g/10 min, as measured at 220° C. and 10 kg.

6. The thermoplastic resin composition of claim 1, wherein the first copolymer has a degree of grafting of 35 to 45%.

7. The thermoplastic resin composition of claim 1, wherein a shell of the first copolymer has a weight-average molecular weight of 55,000 to 95,000 g/mol.

8. The thermoplastic resin composition of claim 1, wherein the conjugated diene-based polymer has an average particle diameter of 0.05 to 0.5 μm.

9. The thermoplastic resin composition of claim 1, wherein the first copolymer includes 1.5 wt % or less of an oligomer residue.

10. The thermoplastic resin composition of claim 1, wherein the second copolymer includes 1.6 wt % or less of an oligomer residue.

11. The thermoplastic resin composition of claim 1, which includes:
    to 30 wt % of the first copolymer; and
    70 to 90 wt % of the second copolymer.

* * * * *